Patented May 14, 1940

2,200,357

UNITED STATES PATENT OFFICE 2,200,357

PROCESS FOR RECOVERING METALS FROM SOLUTIONS

Albert B. Doran, Los Angeles, Calif., assignor to Dorex, Inc., Reno, Nev., a corporation of Nevada No Drawing. Application December 27, 1938, Serial No. 247,830

10 Claims. (Cl. 75—108)

This invention relates to the recovery of metals from their solutions and more particularly to the recovery of metals in the form of their insoluble manganites.

It is an object of the present invention to provide a process for recovering a metal from a solution containing a soluble metal salt comprising treating or contacting said solution with an insoluble metallic manganite whereby a metathesis or base-exchange is obtained which serves to form an insoluble manganite of the metal which it is desired to recover, the metallic ion originally associated with the manganite being released to the solution.

It is furthermore an object of the present invention to provide such a process in which the reacting manganite is associated with a metal higher in the electromotive series than the metal which it is desired to recover from solution.

It is furthermore an object of the present invention to replace heavy metals from their solutions by the action of an insoluble alkali or alkaline earth manganite and to recover said heavy metals in the form of insoluble manganite salts.

It is also an object of the present invention to provide a process for the recovery of metals from their manganite salts, and more particularly from such manganite salts as are produced in accordance with this invention.

By the term "manganite" I have here particular reference to salts of manganous acid $HMnO_2$, of which the anhydride $Mn_2O_3$ is well known. In my copending application Serial No. 203,618, now Patent 2,174,570 dated Oct. 3, 1939, I have described a similar process for the recovery of metals in which use is made of salts of $H_2MnO_3$ as the base exchange material, and I have there used the term "manganite" as descriptive of salts in which the acidic radical contains tetravalent manganese. For purposes of differentiation in the present specification, I shall use the term "permanganites" for salts containing acidic manganese in the tetravalent form and the term "manganite" for salts containing acidic manganese in the trivalent form.

The reagent manganite may be advantageously prepared as an alkali manganite, e. g., by alkaline hydrolysis of a manganic salt, or oxidation of manganous hydroxide in the presence of an alkali, or reduction of higher valenced compounds of manganese in the presence of alkali. Usually the compound thus prepared contains substantial quantities of hydrated $Mn_2O_3$, a portion of which may be associated with the desired compound in the form of alkali polymanganites or acidic salts of alkali and the acid $HMnO_2$. Such polymanganites are also effective in my process. Frequently the preparation results in the concomitant formation of permanganites, which, as I have disclosed in my copending application, are also effective base exchange materials, and I may use such a mixture comprising manganites and permanganites to excellent advantage.

According to their method of production, the manganites may be obtained in more or less pure form, although it is not necessary for the practice of my invention that they be pure. For example, I may use a mixture in which sodium manganite is associated with more or less $Mn_2O_3$ or other oxide of manganese.

The manganite salts are in general highly insoluble in water and as usually prepared represent dark brown to black, finely divided solids.

I have discovered that a manganite salt of a given metal has the property of replacing from solution any metal lower in the electromotive series. For example, I may take a solution of copper nitrate in water and add thereto sodium manganite or a sodium manganite bearing material in such proportion that the quantity of sodium is slightly in excess of that chemically equivalent to the copper. The manganite is suitably added as a powder and kept in contact with the solution by agitation during the reaction. I find that under these conditions the sodium manganite is rapidly transformed into copper manganite, the sodium ion thereby released being taken up by the solution as sodium nitrate. After a sufficient period has elapsed to insure the completeness of the reaction, the solution will be found free from even spectroscopic traces of copper.

When a very finely divided manganite is used, only a few minutes of intimate contact are necessary for the completion of this metathesis or base exchange.

The insoluble black powder now bearing as copper manganite all of the copper originally present in the solution may be separated from the spent solution by filtration, decantation, or other suitable method. The copper manganite thus obtained may, if desired, be used to replace metals which lie below copper in the electromotive series. For instance, if brought into contact with a solution of silver nitrate or other soluble silver salt, a silver manganite will be obtained and copper will be released to the solution in equivalent proportion to the silver absorbed. It is not necessary, however, to proceed through intermediate steps such as those just indicated, since silver may be absorbed directly from solution by the use of an alkali manganite or the manganite of any metal lying above silver in the electromotive series.

Having obtained the desired metal in the form of its manganite salt, it may be further worked up in various ways. For example, it may be treated with a solution of a metal still lower in the electromotive series, thereby obtaining an aqueous solution of the desired metal in the form of a soluble salt. Again, the desired metal manganite may be worked up by various metallurgical methods to obtain the desired metal. In many instances the metal may be obtained directly from the manganite salt by heating of the latter. Thus, for example, silver manganite is decomposed at temperatures around 1900° F. to form molten silver metal and various oxides of manganese, the molten silver collecting as a puddle at the bottom of the charge. Gold and other noble metal manganites may be similarly decomposed by heat.

When a solution containing a mixture of various metals is treated with manganite according to the present process, the absorption is preferential beginning with the metal which is lowest in the electromotive series, the remaining metals not being absorbed or being absorbed only after the solution is exhausted in the least electro-positive metal.

An apparent exception to this general rule arises in the case of hydrogen. Hydrogen ion is displaced from water only with difficulty, if at all, by a manganite lying above hydrogen in the electromotive series, for example, potassium manganite. On the other hand, hydrogen manganite, or manganous acid, does serve as a suitable reagent for the displacement of metals lying below hydrogen in the electromotive series, for example, copper, silver, or gold, the exchange in this latter case being accomplished readily and without difficulty. The relative inertness of dissolved hydrogen ions toward manganites of metals lying above hydrogen in the electromotive series makes it possible to conduct replacement reactions among the compounds of metals higher than hydrogen in the electromotive series in neutral or even acidic aqueous solutions. For example, an aqueous solution of aluminum nitrate may be treated with sodium manganite to obtain an insoluble aluminum manganite and a solution of sodium nitrate, without substantial metathesis between the sodium manganite and water.

In conformity with this behavior, the reagent or base-exchange manganite may be described as the manganite salt of any metal or base higher in the electromotive series than the metal which it is desired to recover, and including the manganite salt of hydrogen (manganous acid). It should be noted, however, that the process is not designed to displace or recover hydrogen ion from aqueous solutions, and in speaking of the recovery of metals reference is had only to the true metals, excluding hydrogen.

While the electromotive series as normally presented provides a criterion for the base exchanges or replacements possible by the practice of my invention, with certain exceptions as to hydrogen as above noted, it is not to be implied that metals not listed in the usual electromotive series are not amenable to my process. For example, I have found that elements such as thorium, uranium, radium, palladium, and the like, which are not listed in the usual electromotive series, are all replaceable from their solutions by manganite salts of metals high in the electromotive series, such as potassium, strontium, or calcium manganite. In general I find that the relative replaceability of these unlisted elements may be inferred from their position in the periodic system following the approximate relationship existing between electrode potentials and positions in the periodic table.

As above indicated, my invention does not necessitate the use of a pure manganite. The usual method for the formation of a manganite salt results in the concomitant production of substantial amounts of $Mn_2O_3$. Such a mixture may be used for the absorption of other metals as above described. The base exchange efficiency of such a mixture, for example, a mixture as produced by the oxidation of $MnOH_2$ in the presence of potassium hydroxide, depends on the amount of insoluble potassium present in such a mixture, this value corresponding to the proportion of true alkali manganite, either in the form of a simple manganite such as $K_2MnO_3$ or of a complex manganite such as $K_2Mn_5O_{11}$. When such an impure alkali manganite is used to form other metal manganites according to my process, the metal content of the manganite so produced will be found to be substantially equivalent to the original content in insoluble potassium.

In at least some instances I find it preferable to use alkali and alkaline earth manganites for the recovery of less electro-positive metals, such as the heavy metals, in preference to manganites of other metals of suitably electropositive character. Furthermore, the alkali and alkaline earth manganites are the most readily prepared and may correspondingly be regarded as primary materials for my process, although it is not intended to imply that it is necessary to start with these particular manganites. For example, copper or other metallic manganites may be prepared by known methods and used as the primary or reagent manganite.

While it may reasonably be assumed that the active alkaline (or other metallic) constituent associated with the manganese dioxide in an insoluble form is actually present as a true manganite, and properly termed as such, I do not wish to be bound by any theory as to the precise molecular structures involved, and where reference is made to a manganite salt, I wish only to imply that the basic oxide and manganese sesquioxide are in an associated or compound form, which form is characterized by its insolubility in water and its property of base exchange as herein described.

Various means may be employed for intimately contacting the manganite with the solution to be treated and for the separation of the manganite and spent solution after treatment. It is frequently advantageous to accomplish these objects in a single step, as by percolation of the liquid to be treated through a porous bed or diaphragm comprising the reagent manganite, supported if necessary on inert granular material.

The details of the above examples are illustrative only, the proper scope of my invention being delineated in the appended claims.

I claim as my invention:

1. A process for the recovery of a metal from solution, comprising: contacting said solution with a manganite salt of a metal more electropositive than the desired metal, whereby an insoluble manganite salt of the desired metal is formed; and separating said insoluble salt from the spent solution.

2. A process for the recovery of a heavy metal from its aqueous solution, comprising: contacting said solution with a finely divided insoluble compound of an oxide of trivalent manganese and an oxide selected from the class consisting of the oxides of the alkali metals and the alkaline earth metals, whereby said heavy metal replaces the alkali or alkaline earth metal in said compound; and separating said compound bearing the heavy metal from the spent solution.

3. A process for recovery of a metal from solution, comprising: contacting said solution with an insoluble manganite salt of a metal more electro-positive than the desired metal, said manganite in amount being at least slightly in excess of that chemically equivalent to the metal which it is desired to recover, whereby an insoluble manganite salt of the desired metal and a spent solution substantially exhausted in said metal are formed; and separating said insoluble salt from the spent solution.

4. A process for recovery of a heavy metal from its aqueous solution, comprising: contacting said solution with a finely divided insoluble compound of an oxide of trivalent manganese and an oxide selected from the class consisting of the oxides of the alkali metals and the alkaline earth metals, whereby said heavy metal replaces the alkali or alkaline earth metal in said compound; maintaining said contact until the solution is substantially exhausted in said heavy metal; and separating said compound bearing the heavy metal from the spent solution.

5. A process for the recovery of a metal from solution, comprising: contacting said solution with an insoluble compound of a base and an oxide of trivalent manganese, said compound having base-exchange properties whereby the base of said compound is adapted to exchange with the metal which it is desired to remove from solution; causing said base-exchange to take place, whereby the desired metal replaces the base in the manganese compound, said compound being taken in amount sufficient to recover the desired metal substantially completely from the solution; separating the insoluble compound thus formed and containing the desired metal from the spent solution; and recovering the metal from said insoluble compound.

6. A process as in claim 5, in which the desired metal is gold and in which the gold is recovered from the insoluble compound containing said gold by roasting at elevated temperatures.

7. A process as in claim 5, in which the desired metal is silver and in which the silver is recovered from the insoluble compound containing said silver by roasting at elevated temperatures.

8. A process for the recovery of a metal from solution, comprising: contacting successively flowing increments of the solution to be treated with an insoluble compound of a base and an oxide of trivalent manganese, said compound having base-exchange properties whereby the base of said compound is adapted to exchange with the metal which it is desired to remove from solution; causing said base-exchange to take place with each increment of solution, whereby the desired metal progressively replaces the base in the manganese compound; and separating the spent increments of solution from further contact with said compound.

9. A process for recovering a heavy metal from a dilute aqueous solution thereof, comprising: contacting the dilute aqueous solution with an insoluble manganite of a metal of the group consisting of alkali and alkaline earth metals to form an insoluble manganite of the heavy metal and a solution substantially free of said metal; separating the insoluble manganite from the spent solution; and recovering the heavy metal from said manganite.

10. A process as in claim 8, in which the base originally associated with the manganese oxide is a metal of the class constituted by alkali and alkaline earth metals and in which the recovered metal is a heavy metal.

ALBERT B. DORAN.